US011238042B2

(12) United States Patent
Wang et al.

(10) Patent No.: US 11,238,042 B2
(45) Date of Patent: Feb. 1, 2022

(54) KNOWLEDGE ENABLED DATA MANAGEMENT SYSTEM

(71) Applicant: Accenture Global Solutions Limited, Dublin (IE)

(72) Inventors: Zhijie Wang, San Francisco, CA (US); Colin Anil Puri, San Jose, CA (US); Teresa Sheausan Tung, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 688 days.

(21) Appl. No.: 16/151,811

(22) Filed: Oct. 4, 2018

(65) Prior Publication Data

US 2019/0102430 A1    Apr. 4, 2019

Related U.S. Application Data

(60) Provisional application No. 62/568,198, filed on Oct. 4, 2017.

(51) Int. Cl.
*G06N 7/00* (2006.01)
*G06F 16/28* (2019.01)
*G06F 16/36* (2019.01)
*G06F 16/2453* (2019.01)

(52) U.S. Cl.
CPC ...... *G06F 16/24549* (2019.01); *G06F 16/284* (2019.01); *G06F 16/367* (2019.01); *G06N 7/005* (2013.01)

(58) Field of Classification Search
None
See application file for complete search history.

(56) References Cited

U.S. PATENT DOCUMENTS

| 9,189,531 | B2 | 11/2015 | Joshi et al. |
| 9,501,565 | B1 * | 11/2016 | Ajmera ............... G06N 5/02 |
| 9,953,081 | B2 | 4/2018 | Gomadam et al. |
| 10,586,156 | B2 * | 3/2020 | Merdivan .......... G06F 16/3344 |
| 10,606,893 | B2 * | 3/2020 | Brennan ............... G06N 5/022 |

(Continued)

OTHER PUBLICATIONS

Extended European Search Report for European application No. 18198625.8, dated Nov. 20, 2018, pp. 1-9.

(Continued)

*Primary Examiner* — Robert W Beausoliel, Jr.
*Assistant Examiner* — Cheryl M Shechtman
(74) *Attorney, Agent, or Firm* — Crowell & Moring LLP

(57) ABSTRACT

A knowledge enabled data management system ingests data and stores the data as an instance in a knowledge graph according to a domain specific ontology. The instance includes stored relationships of the entities in the instance. A query regarding the data may be parsed to derive a first query entity that is used to search the knowledge graph for a first graph entity corresponding to the first query entity. Results may be returned including a first identification of the first graph entity, a second identification of at least a second graph entity related to the first graph entity stored within the knowledge graph, and additional data corresponding to the first graph entity and to the second graph entity. The additional data may include a probabilistic measure of the relationship of the first graph entity to the second graph entity.

14 Claims, 9 Drawing Sheets

(56) References Cited

U.S. PATENT DOCUMENTS

| | | | |
|---|---|---|---|
| 10,831,811 B2* | 11/2020 | Kraus | G06F 16/3346 |
| 10,860,934 B2* | 12/2020 | Lindsley | G06N 5/048 |
| 2012/0158633 A1 | 6/2012 | Eder | |
| 2015/0095303 A1 | 4/2015 | Sonmez et al. | |
| 2016/0063106 A1 | 3/2016 | Chai et al. | |
| 2016/0379120 A1 | 12/2016 | Merdivan et al. | |
| 2018/0082183 A1* | 3/2018 | Hertz | G06Q 10/10 |

OTHER PUBLICATIONS

Tan, Chuanqi, et al., "Entity Linking for Queries by Searching Wikipedia Sentences," *Proceedings of the 2017 Conference on Empirical Methods in Natural Language Processing*, pp. 68-77, Copenhagen, Denmark, Sep. 7-11, 2017. © 2017 Association for Computational Linguistics.

Examination Report issued in European Patent Application 18198625.8 dated Apr. 8, 2020, 5 pages.

Examination Report No. 1 issued in corresponding Australian patent application No. 2018241092 dated Feb. 14, 2019, 7 pages.

European Examination Report for corresponding European Patent application 18198625.8, dated Apr. 8, 2020, 5 pgs.

* cited by examiner

KNOWLEDGE ENABLED DATA MANAGEMENT SYSTEM

CROSS REFERENCE TO RELATED APPLICATIONS

This application claims the benefit of U.S. Provisional Application No. 62/568,198 filed Oct. 4, 2017, the entirety of which is hereby incorporated by reference.

TECHNICAL FIELD

This disclosure relates to complex system architectures for storing data within a database and searching the data within the database.

BACKGROUND

Traditional approaches for searching enterprise data typically entail using string matching mechanisms. However, such previous approaches are limited in their ability to provide queried data. Moreover, most of the data stored within an enterprise is dark, meaning is it not easily searchable or available for analytics. Accordingly, conventional knowledge query systems return results that do not provide a complete picture of knowledge and data available in the enterprise, requiring extra consumption of computing resources as knowledge queries are repeated and return inaccurate or incomplete results.

SUMMARY

In a first aspect, a knowledge enabled data management system ingests data and stores the data as an instance in a knowledge graph according to a domain specific ontology. The instance includes stored relationships of the entities in the instance. A query regarding the data may be parsed to derive a first query entity that is used to search the knowledge graph for a first graph entity corresponding to the first query entity. Results may be returned including a first identification of the first graph entity, a second identification of at least a second graph entity related to the first graph entity stored within the knowledge graph, and additional data corresponding to the first graph entity and to the second graph entity. The additional data may include a probabilistic measure of the relationship of the first graph entity to the second graph entity.

In a second aspect, the system includes knowledge extraction circuitry configured to receive first data, store a first data instance representative of the first data in a knowledge graph stored within a database according to a first ontology corresponding to the first data. The system includes query interface circuitry configured to receive a query regarding the first data and parse the first query to derive a first query entity. The system also includes knowledge aggregator circuitry configured to search the knowledge graph stored within the database for a first graph entity corresponding to the first query entity, the first graph entity comprising a portion of the first data instance, return to the query interface a first identification of the first graph entity; and return to the query interface a second identification of at least a second graph entity related to the first graph entity via the first data instance and stored within the knowledge graph. The query interface circuitry is further configured to provide, responsive to the query, second data corresponding to the first graph entity and third data corresponding to the second graph entity.

The knowledge enabled data management system encodes entity data with semantic information. The data management system incorporates many interfaces to capture human knowledge to enrich factual representation of the data. This semantic integration of knowledge and data via automatic and manual means provides a multi-modal knowledge graph data store with enriched information that can provide deeper information extraction responsive to semantic search queries. For example, in one aspect, the system stores metadata including technical data and semantic information relating to the entities and relationships between the data entities using AI and machine learning techniques to determine the enriched information, as well as information derived from manual review of the data by users, according to specific domain ontologies, which are stored within a knowledge graph data store. The system provides for AI and machine learning techniques to parse semantic search queries to search through the enriched information in the knowledge graph data store for results to return. Accordingly, the system requires fewer search queries to return relevant and accurate data responsive to the information desired. The system may also receive semantic search queries and extract more detailed information to return enriched search results using fewer computing resources.

In a further aspect, the knowledge aggregator circuitry is further configured to determine at least one of the second data corresponding to the first graph entity and the third data corresponding to the second graph entity includes a probabilistic measure of the relationship of the first graph entity to the second graph entity.

In another aspect, the system further includes, in any combination with the above elements, enterprise analytics circuitry configured to determine a third graph entity of the first data instance is not completed with information from the first data, review the knowledge graph to determine inferred information to complete the third graph entity of the first data instance, the determination of the inferred information comprising at least one of a deduction, an induction, or an abduction; and complete the third graph entity of the first data instance with the inferred information.

In yet another aspect, the system further includes, in any combination with the above elements, data extraction circuitry configured to determine whether the first data received from a first data source sources requires a manual onboarding process or an automated extraction process, route the first data to a manual onboarding process when a data type associated with the first data has not yet been onboarded, and route the first data to an automated extraction process when the data type associated with the first data has already been onboarded.

In still another aspect, the system further includes, in any combination with the above elements, insight extraction circuity configured to receive the first data from the data extraction circuitry, detect one or more perceived relationships within the first data according to the first ontology; and store the one or more perceived relationships within an insight database as associated with the first data.

In yet still another aspect, the system further includes, in any combination with the above elements, reconciliation circuitry configured to receive the first data from the data extraction circuitry, receive the one or more perceived relationships within the first data from the insight database, receive an input validating that the one or more perceived relationships are correct; and validate the first ontology as associated with the first data.

In a further aspect, the system further includes, in any combination with the above elements, relationship extraction circuitry configured to determine a set of relationships corresponding to the first data stored within a second database, and store the set of relationships within an insight database as associated with the first data.

In another embodiment, the invention includes methods that performs the steps for which the above noted circuitry is configured, in any combination. In yet another embodiment, the invention includes a computer program product comprising a non-transitory computer readable medium having stored thereon computer executable instructions that when executed cause the computer to performs a method including the steps for which the above noted circuitry is configured, in any combination. These and other aspects of the systems, methods and products are described herein.

DETAILED DESCRIPTION

According to various embodiments, a knowledge enabled data management system combines knowledge graph based applications and search engines to improve search result accuracy and relevancy by performing query expansion, entity disambiguation, concept modelling, and tree traversal. According to these various embodiments, technical improvements are realized, specifically resulting in the retrieval of more relevant and accurate information, thereby saving end users time by reducing the need to sift through data, whether that data be structured or unstructured.

Various approaches disclosed herein utilize domain specific knowledge and other domain specific customization to capture relationships between data, thereby enabling importing and retrieval of data in a manner that leverages the domain specific knowledge to provide more relevant and accurate information. In various embodiments, one or more knowledge ontologies (e.g., schemas) that are domain specific are create. Domain experts or other users may create the domain specific ontologies, or the knowledge enabled data management system may utilize other available ontologies. The knowledge enabled data management system uses data processing systems and methods to populate a knowledge graph with instances of the ontologies, including entities therein, related to data received by the knowledge enabled data management system. The knowledge enabled data management system also provides a search engine that utilizes the knowledge graph and ontologies to provide relevant and expanded search results based on relationships stored within the knowledge graph and/or the ontologies. Various other approaches have been disclosed, specifically in the context of capturing relationships between data stored within a data lake. For example, see U.S. Publication No. 2016/0253364, bearing U.S. patent application Ser. No. 14/870,671, titled "System for Linking Diverse Data Systems," the entirety of which is hereby incorporated by reference.

Figure 1:
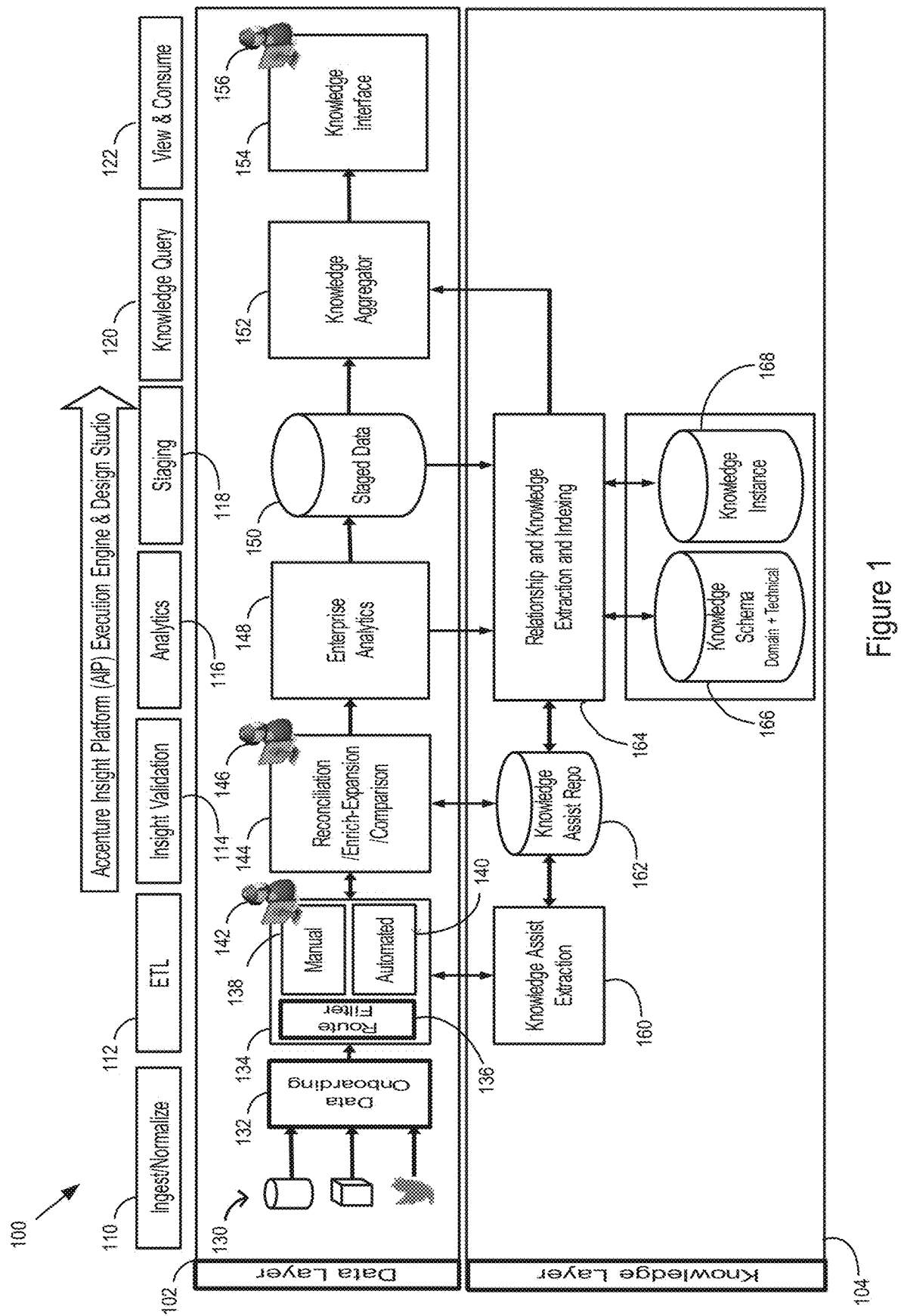
FIG. 1 shows an example knowledge enabled data management system in accordance with various embodiments.

FIG. 1 provides an example context for the discussion of various technical solutions for linking data objects within various databases of a diverse data system described in detail below. It is noted that, for the sake of explanation, the systems and logic below are often described within the context of an example enterprise data regarding oil well drilling platforms. The example setting may include sensors (e.g., pressure sensors, flow sensors, etc.) and other contextual data associated with the drilling systems. Although the discussion below is indeed applicable to and useful with the example water distribution setting, the technical solutions are not limited to the example setting.

FIG. 1 shows an example system architecture of a knowledge enabled data management system 100. The knowledge enabled data management system 100 may be categorized into a data layer 102 and a knowledge layer 104. The data layer 102 handles ingesting, processing, storing, and retrieving of incoming or stored data, while the knowledge layer 104 may extract and maintain knowledge about that stored data. In various embodiments, various circuitry elements of the knowledge layer 104 create, maintain, and search a knowledge graph corresponding to the actual data handled in the data layer 102. For example, multiple data ontologies (e.g., schemas) may exist and may be domain specific or otherwise customized for particular applications. An ontology is a high-level schema defining how various entities are related. A schema may contain definitions of entity types and the relationship types that connect those entity types including entity descriptions or properties. Relationship and knowledge extraction and indexing circuitry 164 may maintain the ontologies in an ontology database 166 (also called knowledge schema database). Further, the relationship and knowledge extraction and indexing circuitry 164 may generate and/or maintain the knowledge graph in a knowledge graph database 168 by instantiating instances of various ontologies onto the knowledge graph according to data received by the system 100. The knowledge extraction and indexing circuitry 164 may use NLP applications to parse data and index results for future reuse. In such a manner, knowledge of the input data is broken up into various entities according to a particular domain specific ontology, and relationships are captured between those entities according to that domain specific ontology. Thus, ontologies may be utilized to operationalize data, analytics and pipelines against domain specific ontologies for enterprise data and information.

Figure 3:
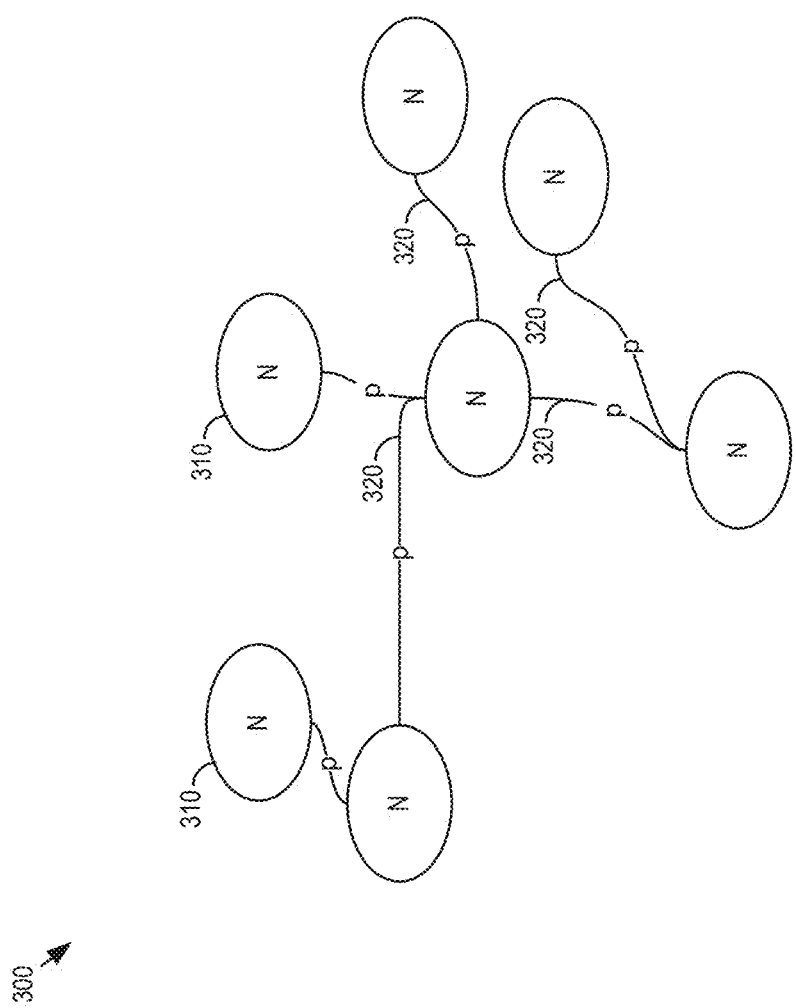
FIG. 3 shows an example ontology useful for development of a knowledge graph data construct.

With brief reference to FIG. 3, an example ontology or schema 300 is illustrated. The example ontology 300 includes entities 310 (or nodes) and relationship edges 320. Relationship edges 320 may also be assigned properties "p" that describe a predicate relationship between the entities 310. Each hop from node 310 to node 310 traverses the connecting edge 320. A schema may contain definitions of entity types and the relationship types that connect those entity types including entity descriptions or properties. An instance is a structure demonstrating a realized graph from the schema definition. Various examples of ontologies or schemas may include a Resource Description Framework (RDF) graph including collections or strings of RDF triples. Other linking formats or protocols are also contemplated, including web links or relational tables. A labeled property graph adds properties to edges and nodes that are not available in RDF. The properties between nodes, and any given labels, are tracked and stored in a database. The properties can travel with the data. In a specific example, in a movie domain context, an example ontology may include various entities that are relevant to movies. For example, one entity 320 may represent a movie title, while other entities may represent actors, production houses, directors, characters, genera, dates, etc. An example relationship edge 320 may exist between a movie title entity and an actor entity that may include an example relationship "has actor." Thus, for example, an instance of a movie specific ontology for the movie Star Wars may have a relationship edge of "has actor" connecting the movie title entity "Star Wars" to an actor entity "Mark Hamill" to indicate that the movie Star Wars includes the actor Mark Hamill. The specific instance of the ontology may include many other entities and relationships as defined by the movie domain specific ontology.

A specific ontology may be created and/or maintained by a domain specific expert. Alternatively, pre-existing ontologies may be utilized, such as those available at schema.org or elsewhere, including known or commonly-used ontologies such as Financial Industry Business Ontology (FIBO), Yet Another Great Ontology (YAGO), Health Level Seven (HL7), Industrial Automation Systems and Integration (ISO 15926—for processing plants including Oil & Gas), etc. By being standardized, the ontologies are extensible and reusable. The ontology specifies various entities, including properties or attributes within that entity that help define the entity. The ontology also specifies what relationships are supported between the different entities. The structure of an ontology may be driven by an anticipated access pattern. For example, in one approach, an entity may include as an attribute or property of that entity information specific to that entity. For example, a person entity may include as an attribute a birthdate of that person. However, in a different approach, instead of including the birthdate as an attribute of an entity, a separate entity may be created including a date, and a relationship edge may be created between the person entity and the date entity with the relationship of "has birthdate." These two different ontology structuring approaches may be utilized in different searching mechanisms. In the first example (birthdate as an attribute of an entity), a user can search for persons with a particular birthdate by finding all person entities and filtering by a birthdate attribute. Alternatively, in the second example (birthday as a relationship between a person entity and a date entity), a user can find all persons with a particular birthdate by finding the entity of the target date and then finding all person entities that are related to the date entity through a birthdate relationship. Thus, how data will be searched and retrieved in the future can dictate how an ontology is designed.

Further, in various embodiments, the relationship and knowledge extraction and indexing circuitry 164 may create and utilize computation transforms and logic transforms within the knowledge graph. In this manner, the relationship and knowledge extraction and indexing circuitry 164 may define one concept or entity's relationship to another concept or entity via a computation transform coded into a relationship within the ontology. For example, if we have a concept or table of employees, those employees are linked to the concept of "employees." However, a second-level categorization of those employees into "managers" or "analysts" may be possibly by computation transformation. For example, managers may be defined as employees with a level greater than 7, while analysts may be defined as employees with a level less than 9.

Further, the various ontologies are dynamic and editable. If it is determined (e.g., by a domain specific expert) that an ontology requires a different structure, such as additional classification or additional information, the ontology can be dynamically altered even though the ontology has already been utilized and the knowledge graph includes many instantiations of the previous version of the ontology. The relationship and knowledge extraction and indexing circuitry 164 can adjust or edit the knowledge graph according to the changed ontology to create new instantiations of the new ontology for previously onboarded data existing within the knowledge graph.

Returning again to FIG. 1, the knowledge enabled data management system 100 may include various stages including Data Ingestion/Normalization 110, Extraction/Transformation/Loading (ETL) 112, Insight Validation 114, Analytics 116, Data Staging 118, Knowledge Query 120 and View/Consumption 122 of query results. Data Ingestion/Normalization includes data onboarding circuitry 132 which may receive, ingest, normalize, and/or parse received data from various data sources 130. Because data is received from various disparate data sources, normalization of the data is utilized to help the knowledge enabled data management system 100 be able to understand and process the data as received from the various disparate sources. A crawler may be used to manage various data sources, schedule ingestion and perform format conversion for the data onboarding. In the ETL stage, data extraction circuitry 134 may perform various Extract, Transform, and Load (ETL) functions with data received from the data onboarding circuitry 132. The data extraction circuitry 134 may also include a route filterer 136 that determines whether the received data is to be processed through a manual onboarding process 138 (which may utilize assistance from a user through a user interface 142 to properly onboard, route, and configure the received data), or an automated extraction process 140, which utilizes previously established rules or procedures to extract the data received. The route filterer 136 may route the data to the automated extraction process 140 if the data is from a source that the knowledge enabled data management system 100 has previously onboarded, or of a type of data that the knowledge enabled data management system 100 has previously onboarded, or is already familiar with.

Within the knowledge layer 104, knowledge assist extraction circuitry 160, also referred to as insight extraction circuitry, receives the data from the data extraction circuitry 134 and it extracts insights from the data. These insights include rules that can be garnered from the data, and to what data those rules apply. The knowledge or insight extraction may be done automatically if similar data has been ingested before. Rules may be used to apply labels to the data. In one example, the knowledge assist extraction circuitry 160 detects perceived relationships within the data, for example, according to an ontology, and stores those perceived relationships as insights within a knowledge assist data repository 162, also referred to as an insight database 162, as associated with the received data. The knowledge assist data repository 162 may be used in conjunction with the Insight Validation stage 114 implemented by the system to make data accessible to the rest of the RDF.

Within the Insight Validation stage 114, reconciliation circuitry 144 provides a feedback loop for review of the data from the data extraction circuitry 134 compared to the insights stored within the insight database 162. The reconciliation circuitry 144 provides validation rules, manual override rules, and allows admin users to manually create rules. The reconciliation circuitry 144 may determine that the insights stored within the insight database 162 correctly match with the data received from the data extraction circuitry 110. For example, the reconciliation circuitry 144 may use machine learning algorithms to make such determinations. In another approach, the reconciliation circuitry 144 provides a user with a user interface 146 to enable the user to compare the insights stored within the insight database 162 against the data received from the data extraction circuitry 132 and to reconcile any differences by updating the insights within the insight database 162 and/or altering the data or data schemes associated with the data received from the data extraction circuitry 148.

Within the Analytics stage 116 of the stem processing, analytics circuitry 148 (also referred to as enterprise analytics circuitry) implemented in the data layer can receive data that has run through the reconciliation circuitry 144. The analytics circuitry 148 includes an analytics engine that performs rule mining, correlation mining annotation and attribute aggregation. The analytics circuitry 148 provides reasoning mechanisms to complete data storage and knowledge graph instantiation, for example, to complete entities and attributes required according to a particular ontology, but which are missing within the received data. In one approach, the analytics circuitry 148 can complete missing entities through deductive reasoning, inductive reasoning, or abductive reasoning. The analytics circuitry 148 can traverse the knowledge graph to determine various logical relationships and/or probabilities for various entities already stored within the knowledge graph. For example, with deductive reasoning, the analytics circuitry 148 can traverse or search the knowledge graph or a particular ontology to determine that a certain type of entity or relationship always exists or always leads to a certain conclusion. For example, if an ontology for a parts list for a vehicle, or a populated knowledge graph including instance of the ontology for a parts list for a vehicle, indicates that a vehicle has at least one wheel, then the analytics circuitry 148 can deduce that a new vehicle must include at least one wheel and can perform other actions to cause that wheel entity of the ontology to be populated with proper data. The analytics circuitry 148 can make further similar deductions from the same ontology and/or knowledge graph.

In another approach, the analytics circuitry 148 can search or review a knowledge graph to induce certain conclusion, for example, based on probabilities. For example, in a movie domain, if 90% of movies from a particular production company are associated with an entity or attribute indicating that the movies are within an animated movie genre, then the analytics circuitry 148 could safely induce that a new instance of a movie from that production company is likely also an animated movie. Thus, in the case where such information (e.g., genre) is missing from incoming data to be onboarded, the analytics circuitry 148 can induce that information and add it to the knowledge graph as an attribute or entity associated with the new instantiation. Similarly, the analytics circuitry 148 may use abduction to arrive at such conclusions by determining that the conclusion is the most probable conclusion. The analytics circuitry 148 may search the knowledge graph and ontologies to utilize information stored therein to make such abductions. Using inductive or probabilistic analysis, the analytics circuitry may take advantage of probabilities associated with each entity or with the edges between entities. Thereby, the analytics circuitry 148 or the knowledge aggregator circuitry 152 may determine probabilities of relationships by the joint probability of related entities, which are aggregated as the query traverses the knowledge graph in response to a query. These probability measures may be useful for providing probabilistic uncertainties or rankings of search results to queries that may not have certain answers.

Once the data has been processed, the analytics circuitry 148 causes the data to be stored in a staged data database 150 for recall at a later time. The staged data database 150 may be a data system including a single database or including multiple disparate databases storing multiple different data objects. For example, these different databases may include a data lake (such as, for example, a Hadoop Distributed File Systems (HDFS)). A data lake is a database or datastore that stores a massive scale and variety of data in its native raw state and/or in an interpreted state. For example, as linked devices (e.g., sensors) generate raw data, that raw data can be stored within the data lake for later consumption, use, or interpretation by applications or users. The data lake may include multiple separate databases and/or datastores that together make up the data lake, or the data lake may be a singular datastore.

Additionally, once data has been processed through the analytics circuitry 148, or in conjunction with the analytics processing, the relationship and knowledge extraction and indexing circuitry 164 may instantiate an instance of the ontology into the knowledge graph, completing entities and attributes within the instance with data received from the analytics circuitry 148, which may include data originally received from the data sources 130 and/or may include data derived manually with suggestions or automatically through logical reasoning techniques, such as deduction, induction, or abduction, by the analytics circuitry 148. Using machine learning models, and historical data, the system may learn to automate instance onboarding into the knowledge instance data store 168. The relationship and knowledge extraction and indexing circuitry 164 may also perform document annotation and rule-based post processing as well as NLP processing. The relationship and knowledge extraction and indexing circuitry 164 may also include an entity manager that normalizes entities to the domain specific ontology or schema, develops entity hierarchies, and manage entity retrieval.

The relationship and knowledge extraction and indexing circuitry 164 may store the knowledge graph in a storage device and/or format that supports graph-like access to that data. Example systems or formats include RDF, relational database management system (RDBMS), Titan database, Blazegraph, and the like.

To search the stored data, the system 100 provides query interface circuitry 154 to enable a user 156 or another system to query the system 100 for information relating to the data stored and managed by the knowledge enabled data management system 100. The query interface circuitry 154, also referred to as a knowledge interface, may provide a graphical user interface (GUI) or an application program interface (API) to receive queries (e.g., in natural language or other) and to provide information. The query interface circuitry 154 or the knowledge aggregator circuitry 152 may utilize natural language processing (NLP) to determine one or more entities that are the target of a query. The query interface circuitry 154 may communicate with knowledge aggregator circuitry 152 to search the knowledge graph for entities corresponding to or related to the identified entity in the query. For example, in a movie domain, the query interface circuitry 154 may identify the name of a movie as an entity and may cause the knowledge aggregator circuitry 152 to search the knowledge graph in the staged data 150 and knowledge instance 168 for an entity having the name of the movie. The knowledge aggregator circuitry 152 may traverse the knowledge graph and discover an entity with the name of the movie. The knowledge aggregator circuitry 152 may then return to the query interface circuitry 154 information regarding the identified entity and/or data associated with the entity. The query interface circuitry 154 can in turn provide these results to the user 156 or requesting system. This is an example of precise entity retrieval.

The knowledge aggregator circuitry 152 may also provide to the query interface circuitry 154 broad entity retrieval services through indexing documents, indexing attributes and applying advanced queries that may provide other entity information that is associated with the initial entity that was the target of the search. The knowledge aggregator circuitry 152 may also manage a query parser using NLP processing or enrichment with knowledge, query routing and result ranking. For example, in the movie domain, because actors are associated with the title of the movie within movie domain specific ontology, and thus within the knowledge graph, the aggregator circuitry 152 may also return actor entities that are connected to the movie title entity within the knowledge graph, and may also provide rankings of the actor entities based on the strength of their relationships or multitude of relationships to the movie title entity and other entities having relationships to the movie title entity. As such, the knowledge aggregator circuitry 152 provides an orchestrated framework for putting knowledge into an enterprise's data so that users may obtain more salient transformation of data and more salient query results by searching both instances and concepts along with all related data and documents. The query interface circuitry 154 can in turn provide these results to the user 156 or requesting system providing custom result rendering and facet filtering. The query interface circuitry 154 may provide for display relevant text documents or other media containing information responsive to the query search. Other examples and details are provided below.

As a general matter for all embodiments and aspects described herein, a query entity may include a discrete data element or combination of data elements within a search. The system may parse search queries to determine or recognize mentions of an entity within the search and transform the mention into the search entity, for example, by comparing the search terms with a dictionary or other semantic corpus related to the knowledge graph ontology. This may also involve NLP or other analytical techniques to determine the relevant search entity or entities in view of the knowledge graph schema corresponding to an element in the semantic search query. A graph entity may include a data element or combination of data elements in the database that may correspond to a node or part of a node in a knowledge graph.

Figure 2:
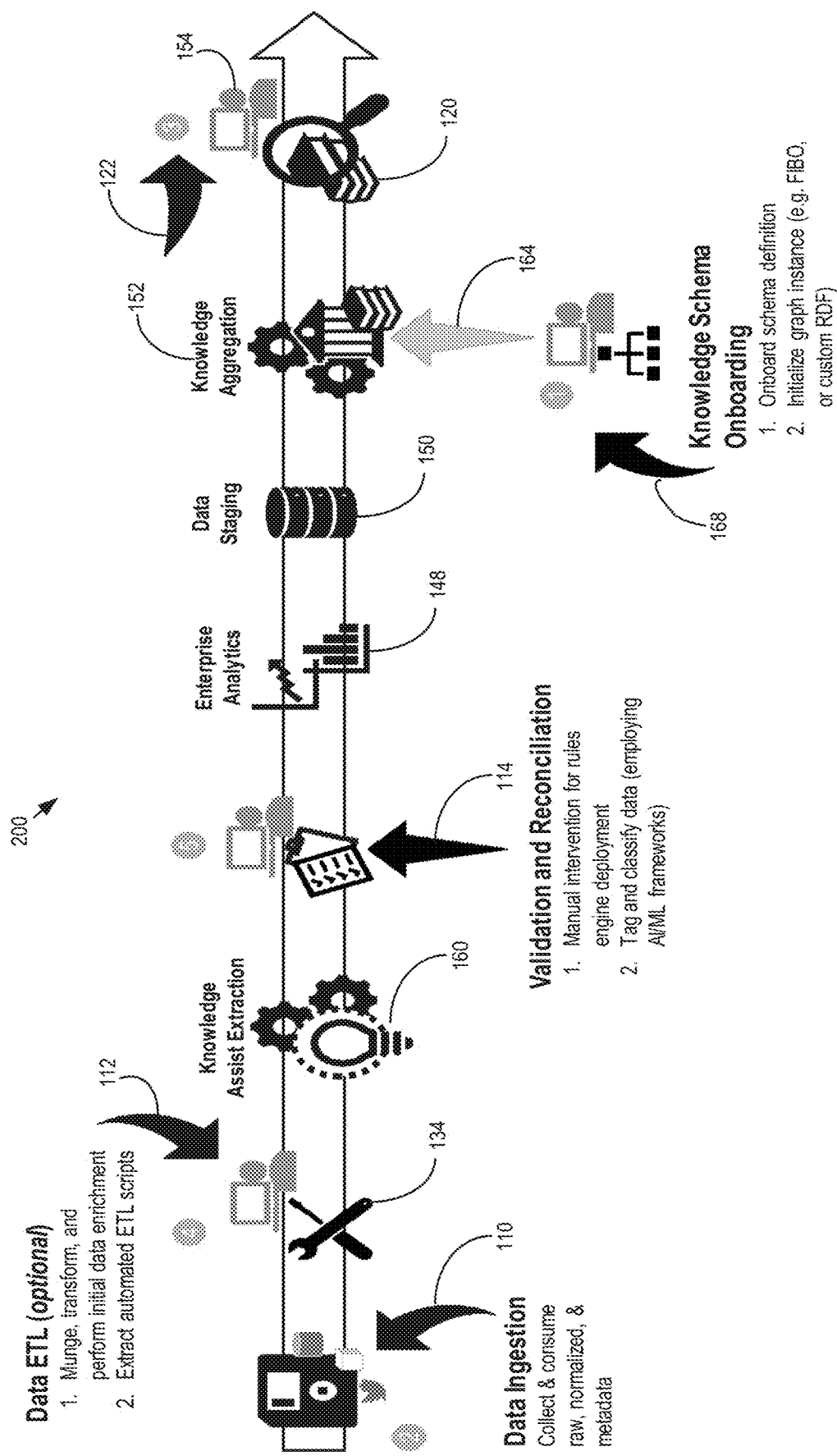
FIG. 2 shows an execution workflow for implementation of a knowledge graph based data management system in accordance with various embodiments.

Referring to FIG. 2, an exemplary execution workflow 200 for implementation of a knowledge graph based data management system is depicted, which may be implemented by the system circuitry 100. For example, at step 1, a knowledge schema may be defined and onboarded into the knowledge schema data store 166. The schema may rely on known or standard industry ontologies, such as for example using a standard ontology (e.g. FIBO) or a custom RDF. The business domain may be modeled with data models. Entities (nodes) are created. The entity properties are defined using data and business concepts. Relationships between entities and nodes are created as key facets to filter across using subject (source node), predicate (edge), object (destination node) type relationships. A labeled property graph may be created, which is richer than an RDF. An instance of a knowledge graph may be initialized in the knowledge instance data store 168. At step 2, the enterprise data is ingested 110 using data onboarding circuitry, which involve the collection or raw data, normalized data and related metadata, using defined data transformations and model ETL processes. The data may be loaded using data mapping models. At step 3, historical user queries 120 are analyzed to determine common and typical query usage, that is, the type of data and insights or knowledge requested through query interfaces 154. This provides enterprise expertise to guide how to process the onboarded data. The business elements and business domain concepts are related to available data and data schema. At step 4, the onboarded data undergoes the ETL processing 112. The data is merged, transformed, and enriched with insights from the historical query review. Automated ETL scripts may be used to automate the process. The knowledge assist extraction circuity 160 performs further data analytics to extract insights from the relationship determined to be present in the data. At step 5, the insight validation and reconciliation 114 is performed initially as a manual intervention to determine rules for engine deployment, and then automatically using the engine to apply the rules to tag and classify the data employing artificial intelligence (AI) and machine learning (ML) frameworks. The enterprise analytics circuitry 148 is used to analyze the data and extract relationships and knowledge of the data for indexing according to the knowledge schema for storage into the knowledge instance repository concurrently with the storage of the transformed, validated data into the staged data repository. The knowledge aggregator circuitry 152 integrates the transformed stage data 150 with the relationship information extracted and stored in the instance of the knowledge graph 168. Thus, queries 120 through the knowledge interface 154 may provide insights from the enriched data obtained through the aggregation of enterprise data and knowledge graph data instance.

The system and methods described herein provide technical improvements on enterprise data and knowledge repository query systems. With the knowledge assistance extraction circuitry 160, the system and method provides for rapid data ingestion. System efficiencies are increased with guided ETL. The enhanced automatic data filtering enables smart data reduction. The ETL transformations are stored and reused for future data ingestion, providing "write once, use many" ETL transformations. With the validation and reconciliation circuitry 144, the system builds codified expert guidance to automate the data classification, which reduces manual intervention overtime. With the knowledge aggregator circuitry 152, the system enables expert automated and knowledge reuse. This provides automated data and expert concept onboarding into the knowledge graph instance and augments the relationship tracking in the knowledge graph schema for supplemental onboarded data. With the knowledge interface circuitry 154, the results of queries are automatically indexed to provide future related queries with more relevant search results. Insight aggregation is also enriched through a unified searchable knowledge graph schema and instance, along with analytics and data through semantic searching techniques. Attributes determined from a past search results may be stored and used in future searches.

The knowledge graph stored by the present system and method includes a sematic representation of the data and its relationship using descriptive natural-like language. As may be seen, interconnected entities with relationship links over which implications can be queried and derived with a reasoning engine. The schema and concepts can be repurposed, reused, inherited, transported and extracted. Unlike a typical relational database, the schema is not set in stone and may evolve over time as new data is onboarded, new labels are added, and new queries are conducted deriving new insights and new properties. The schema may represent highly related data allowing for many interconnected inferences. Searching in the aggregated knowledge graph schema and instance provides filtered information that is directed to key concepts, and provides query expansion and enrichment in a domain model, as well as significantly increased precision with information retrieval.

For example, via the multiple user interfaces 142 and 146, the knowledge may be enriched with semantic information with enriched information that can provide deeper information extraction responsive to semantic search queries. To illustrate, technical data and semantic information may be added to metadata in the knowledge graph data store represented as follows:

Technical information:
  i. Table Well: ID, Name, Lat, Long, MVFS
  ii. Table Equipment Instances: ID, Type, Name, Well ID (ForeignKey)

Semantic Information:
  i. A well can only have one Plunger (For a given Well ID in Equipment Instances Table, there should be only one record).

This semantic information can be encoded as data validation rules, data query rules, data comparison rule, data presentation logic or plain text in the data description/ comment section. This semantic information can further be encoded as pure semantic data on a knowledge graph, for further automated reasoning.

Figure 4:
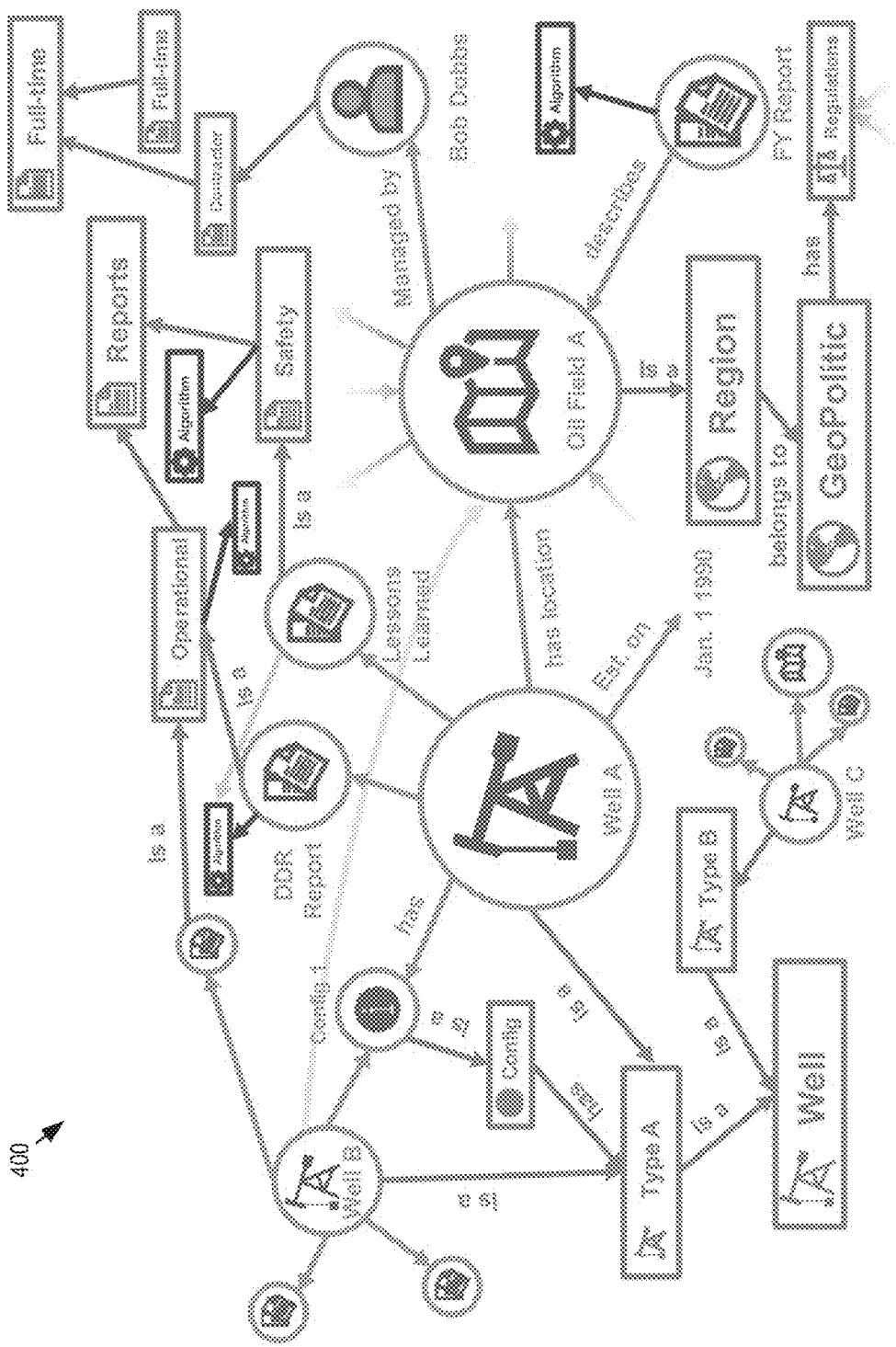
FIG. 4 shows an example of an illustrative instance of a knowledge graph data structure and schema.

Referring to FIG. 4, an example of an illustrative instance of an integrated knowledge graph data structure and schema 400 is shown for data relating to an oil and drilling well platforms. The instances are depicted as the nodes shown in circles, such as Well A, Well B, Oil Field A, DDR Report, etc. The schema are depicted in rectangles, such as, Type A, Type B, Region, GeoPolitic, etc. Algorithms are shown in rectangles overlain to illustrate the application of AI and ML for semantic data mining. Under conventional data queries, a user may initiate a query to "find all documents about "Well A," or "Look up fiscal reports." With Knowledge Enabled Queries according to the present system and method, a user may seek richer semantically based information.

For example, the following queries illustrate the novel approach to allow semantically natural searches and richer results. For a query seeking to know "the most common well type," the system may traverse the knowledge graph instance by determining the well types and counting the edges of each well node in the instance to each type in the schema. For a query seeking the "average well costs for a given region, fiscal report document associated with a specific region (e.g., Oil Field A) may be analyzed to extract key elements and used for computation of costs. For a query seeking "the lessons learned for Well A and what causes failures for similar wells," documents associated with Well A and similar type wells may be located and the operation and safety documents (e.g., daily drilling report (DDR)) analyzed with machine learning algorithms that extract elements and find patterns responsive to the query. For a query seeking to determine "the rate of penetration of water based mud in a given well," the knowledge graph may contain attributes for document internal elements as extracts that are separately linked by concepts or types, to provide results buried deep within detailed reports. For a query seeking to learn "the other wells near Well A," the knowledge graph may follow linkages to infer information as the query traverses nodes, such as from Well A to Oil Filed A and then to Well B. For a query seeking to learn "whether any regulations will be violated by performing a certain drilling procedure," the system circuitry may traverse the knowledge graph (e.g., from Oil Field A to Region to Geopolitic to Regulations) to find relevant information and return ranked results (e.g. the existing wells and the existing regulations, etc).

Figure 5:
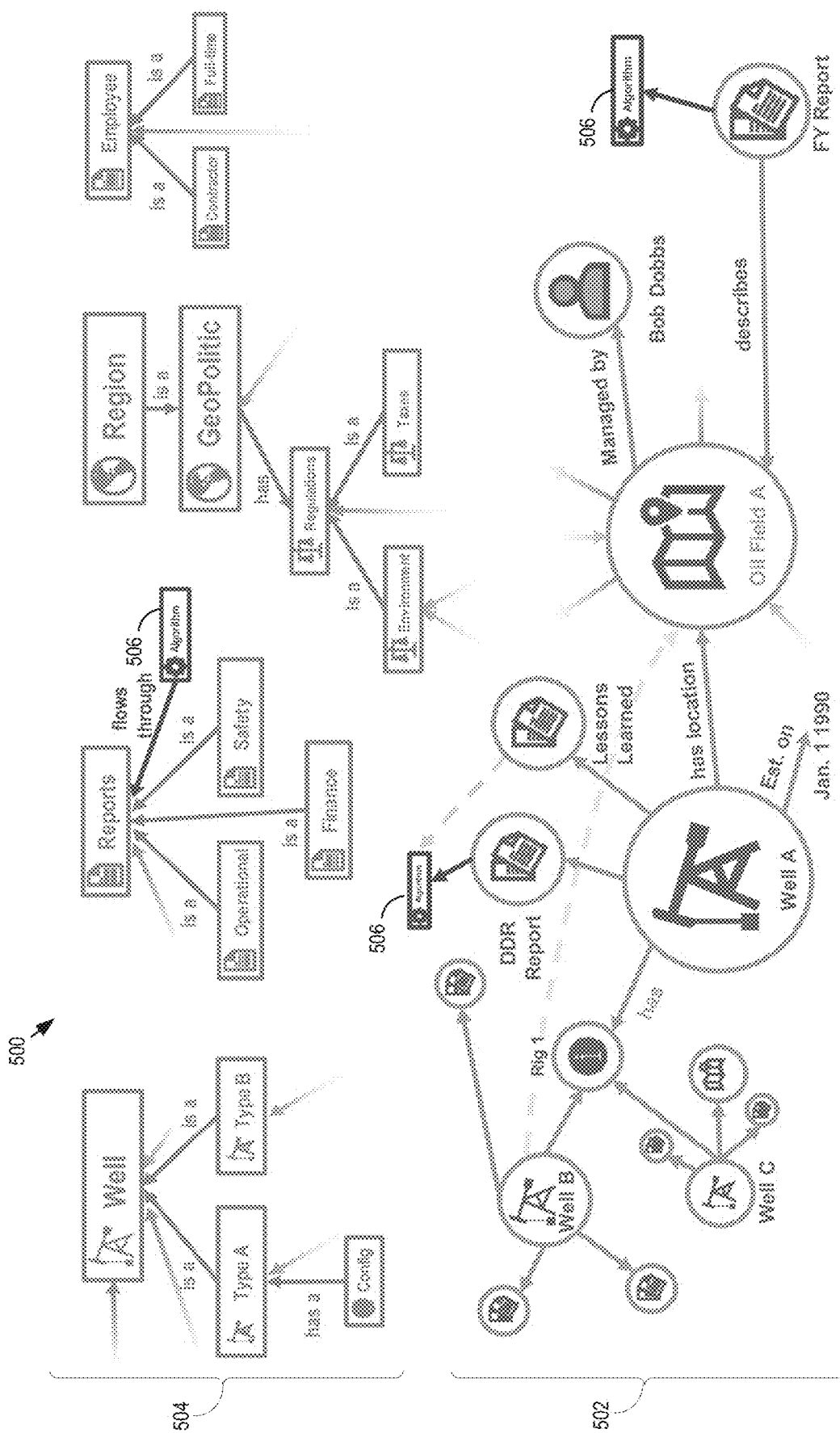
FIG. 5 shows an example of a disambiguation of the illustrative instance shown in FIG. 4.

FIG. 5 shows an example of a disambiguated knowledge graph 500 of the illustrative schema and instance shown in FIG. 4. The instance entities and relationships 502 are at the bottom and the schema structure 504 is at top. AI and ML algorithms 506 may be implemented to provide deeper extraction of data from the stored report documents.

Figure 6:
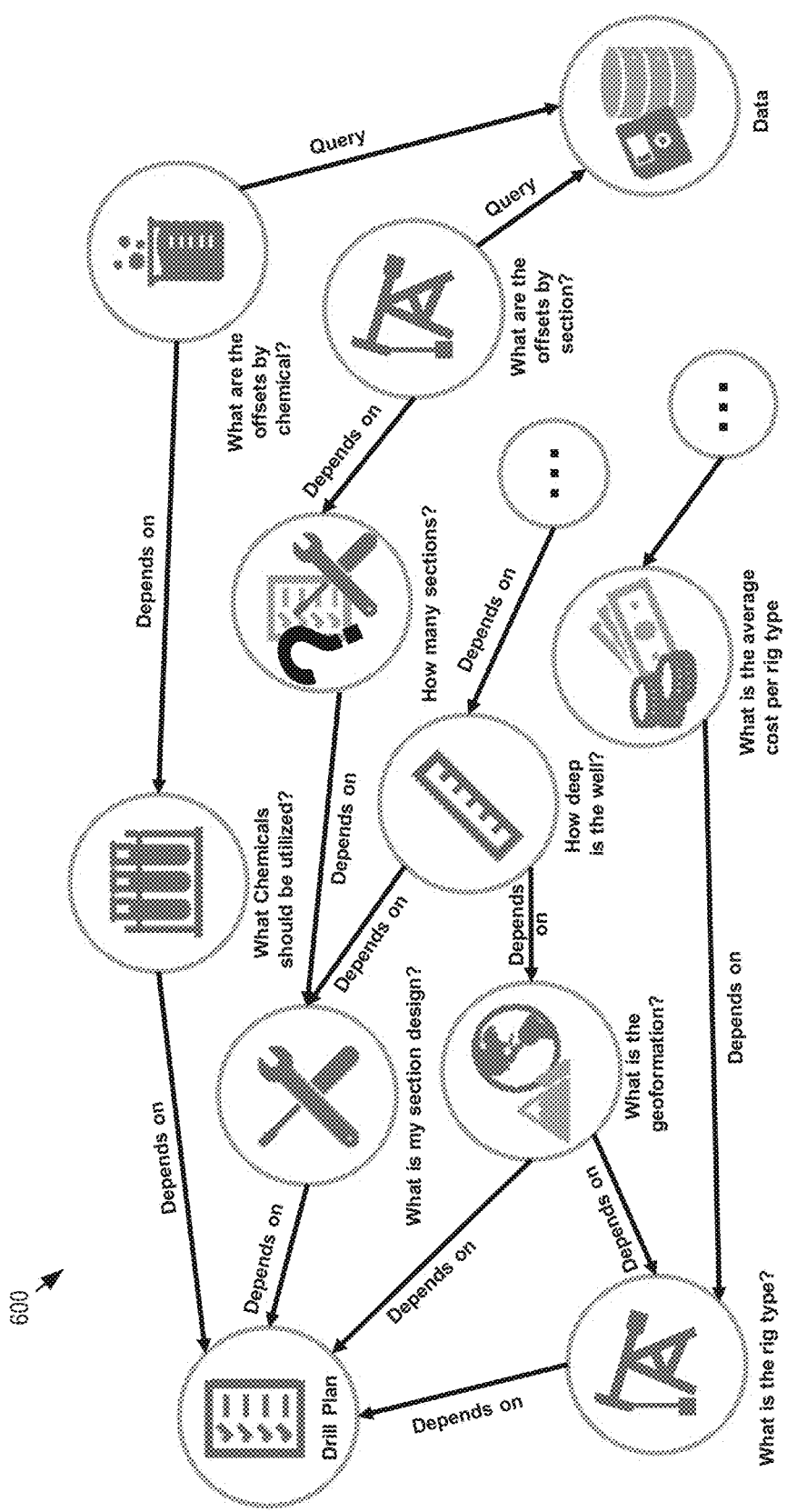
FIG. 6 shows an example of relationship and properties between entities in a knowledge graph conceptual query diagram.

FIG. 6 shows an example of relationship and properties between entities in a knowledge graph query conceptual diagram 600 for the oil and drilling platform example of FIGS. 4 and 5. The relationship and properties may be derived from analyzing typical data queries on the sources of information to respond to such queries, which may then be used to design the knowledge graph structure to be responsive to such queries. This illustrates an example of the knowledge schema onboarding described above with regard to FIG. 2. The dependencies between entities designed in the knowledge graph enable step-by-step traversal of the knowledge graph as a query seeks relevant information associated with a specific entity in an instance.

The following exemplary queries may be useful to further illustrate the present system and method.

Query 1: What other wells are near Well A

Steps:

1. Get "Well A"

a. *Query*: Get the information "Well A" from the graph e.g. Well=g.V()has("Well_Name","Well A")

b. *Result*: Well = "Well A"

2. Determine where "Well A" is located a. *Query*: Get Well A's location e.g.

FieldLocation=g.V().has("Well_Name","Well A).outE("has location")

b. *Result*: FieldLocation = "Oil Field A"

3. Find all nodes whose location is "Oil Field A"

a. *Query*: Get Oil Field A's incoming "has location" link and dereference them to obtain the node list e.g. WellsList=g.V().has("Well_Name","Well A").outE("has location").inE("has location")

b. *Result*: WellsList = [Node "Well B", Node "Well A"]

Query 2: What is the likelihood that Well B's configuration will lead to a failure.

Steps:

1. Is there another Well similar to Well B?

a. *Query*: Get the all wells that have the same configuration as Well B e.g. WellsList=g.V().has("Well_Name","Well B").outE("has location").inE("has location").outE("has config","config 1")

b. *Result*: Well = "Well A"

2. What is the status of Well A, lessons learned and daily drill reports?

a. *Query*: Get the all existing reports from Well A and compute transaction learning algorithm, *E.g. Execute ComputeProbabilityGraph input= g.V().inE("Report_Name","DDR").inE("has report").haslabel("Well_Name","Well A")* b. *Result*: Probability graph Well A

3. Given the state of Well B (from its DDR), the DDR history of Well A, their similar configurations, will Well B fail?

a. Compare Well B to learned model of Well A

Query 3: What are wells related to Oil Field A and a certain rig?

Steps:

1. Find nodes "Oil Field A"

a. *Query: find all nodes, filter by "Oil Field A" e.g. startList=g.V().has("Name", "Oil Field A"))*

2. Find Primary Well Nodes linked to "Oil Field A"

a. *Query: start from start nodes, traverse until encounter "Well" nodes e.g. PrimaryWells = g.V(startList).until(_.hasLabel("Well").repeat(_.outE().inV())* b. *ii. Result; PrimaryWells = [Well A, Well B, Well D]*

3. Find Important Attributes of Primary Wells (by frequency)

a. *Query: start from primary wells, find associated attributes e.g. attributes = g.V(primaryWells).outE().inV()* b. *Result: Attributes = ["Rig1", .....]*

4. Find Recommended Wells Given Important Attributes a. *Query: start from primary wells, find associated attributes e.g. OTherWells = g.V(attribute).inR().outV()* b. *Result: OtherWells = ["Well C" ....]*

Figure 7:
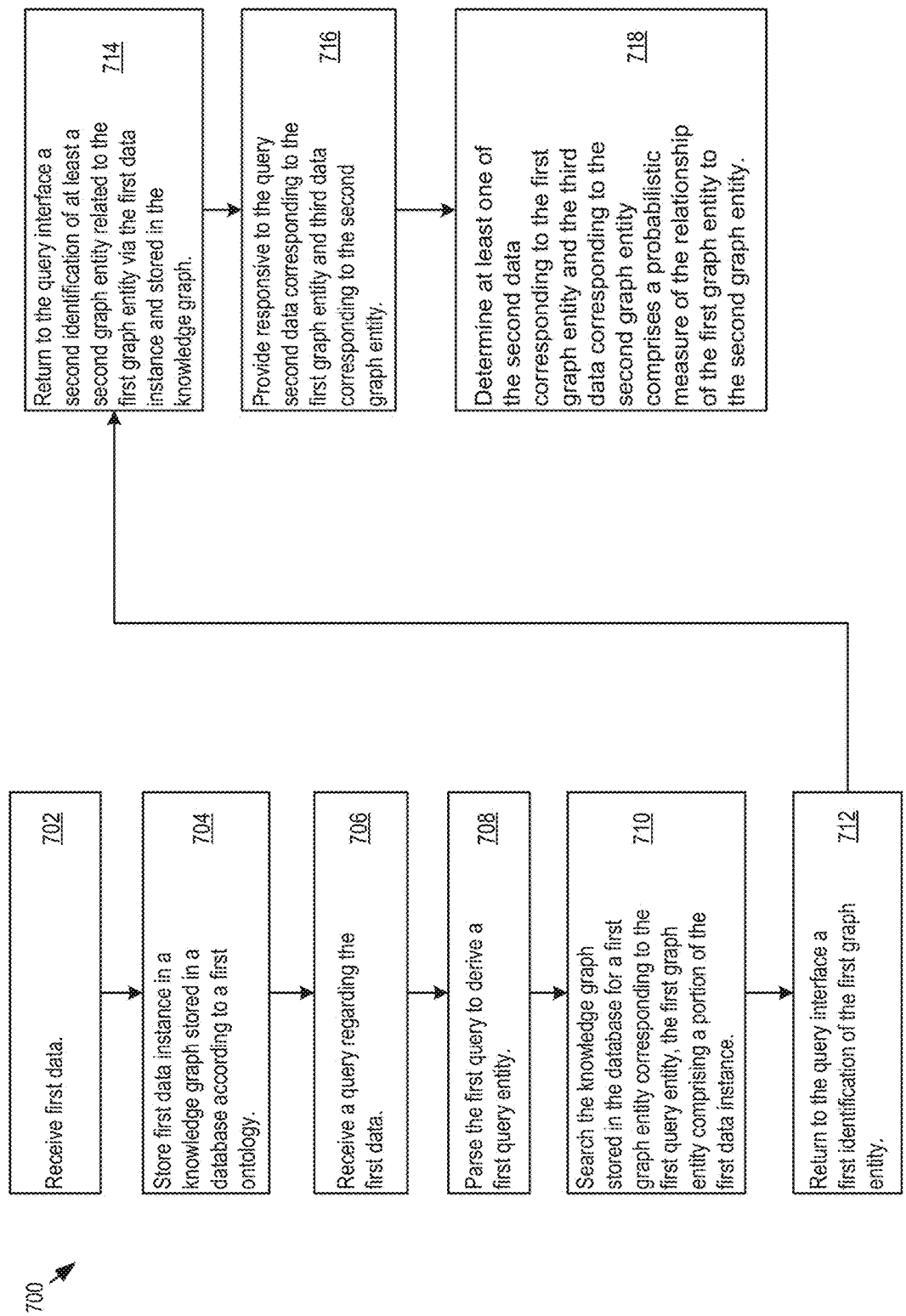
FIG. 7 shows an example of a process flow chart for a method for queries within a knowledge enabled data management system.

The present method includes a process for conducting the search queries in a knowledge graph. FIG. 7 shows an example of a process flow chart 700 for a method for queries within a knowledge enabled data management system. The system receives first data 702, stores a first data instance representative of the first data in a knowledge graph stored within a database according to a first ontology corresponding to the first data 704, receives a query regarding the first data 706; and parses the first query to derive a first query entity 708, searches the knowledge graph stored within the database for a first graph entity corresponding to the first query entity, the first graph entity comprising a portion of the first data instance 710; returns to the query interface a first identification of the first graph entity 712; returns to the query interface a second identification of at least a second graph entity related to the first graph entity via the first data instance and stored within the knowledge graph 714; and provides responsive to the query second data corresponding to the first graph entity and third data corresponding to the second graph entity 716. Optionally the system determines at least one of the second data corresponding to the first graph entity and the third data corresponding to the second graph entity comprises a probabilistic measure of the relationship of the first graph entity to the second graph entity 718.

Figure 8:
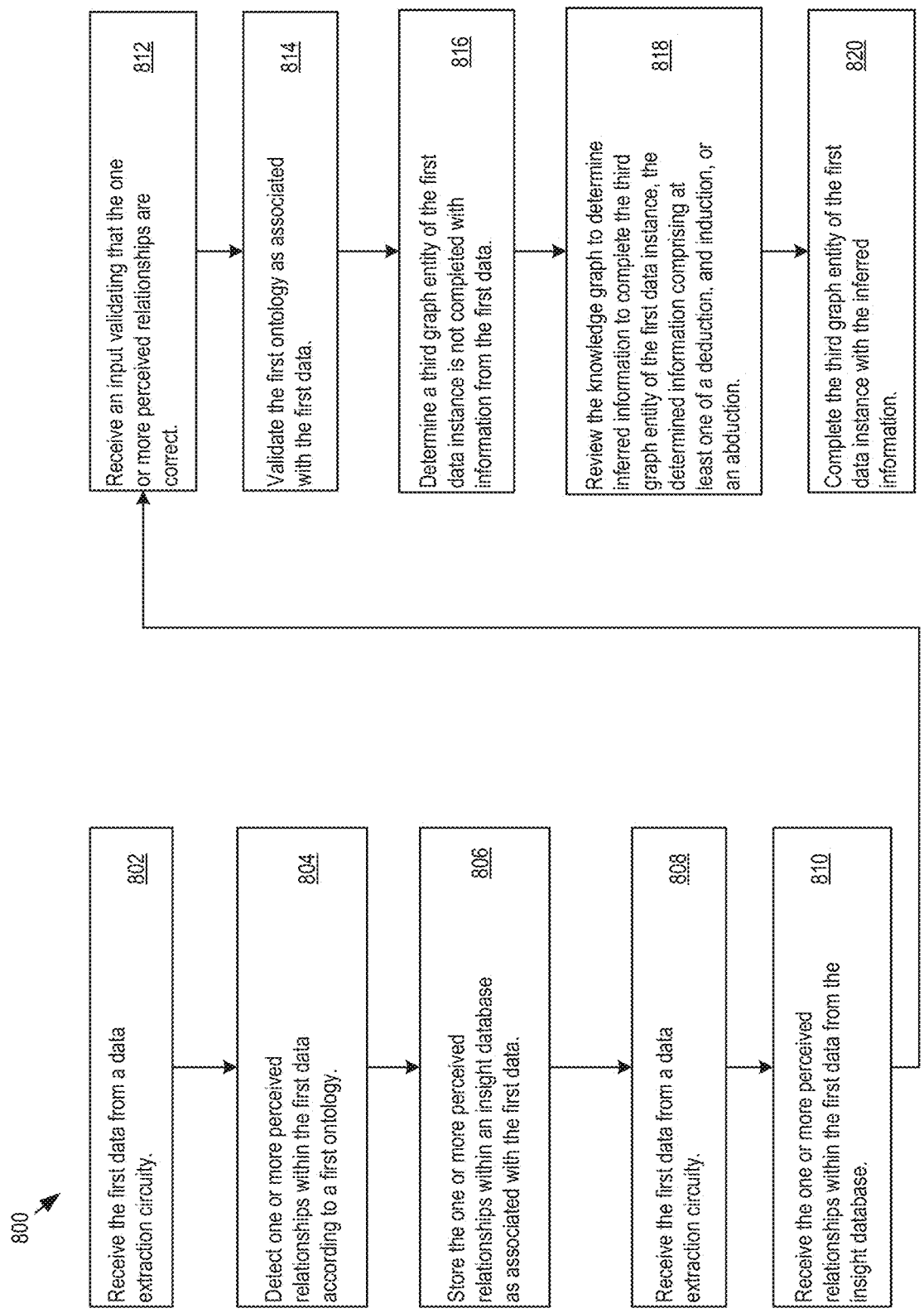
FIG. 8 shows another example of a process flow chart for a method for developing a knowledge graph data structure within a knowledge enabled data management system.

FIG. 8 shows another example of a process flow chart 800 for a method for developing a knowledge graph data structure within a knowledge enabled data management system. The system receives the first data from the data extraction circuitry 802; detects one or more perceived relationships within the first data according to the first ontology 804; stores the one or more perceived relationships within an insight database as associated with the first data 806; receives the first data from the data extraction circuitry 808; receives the one or more perceived relationships within the first data from the insight database 810; receives an input validating that the one or more perceived relationships are correct 812; and validates the first ontology as associated with the first data 814. Optionally, the process may determine a third graph entity of the first data instance is not completed with information from the first data 816; system reviews the knowledge graph to determine inferred information to complete the third graph entity of the first data instance, the determination of the inferred information comprising a logical reasoning technique from at least one of a deduction, an induction, or an abduction 818; and completes the third graph entity of the first data instance, for example, with the inferred information 820.

Figure 9:
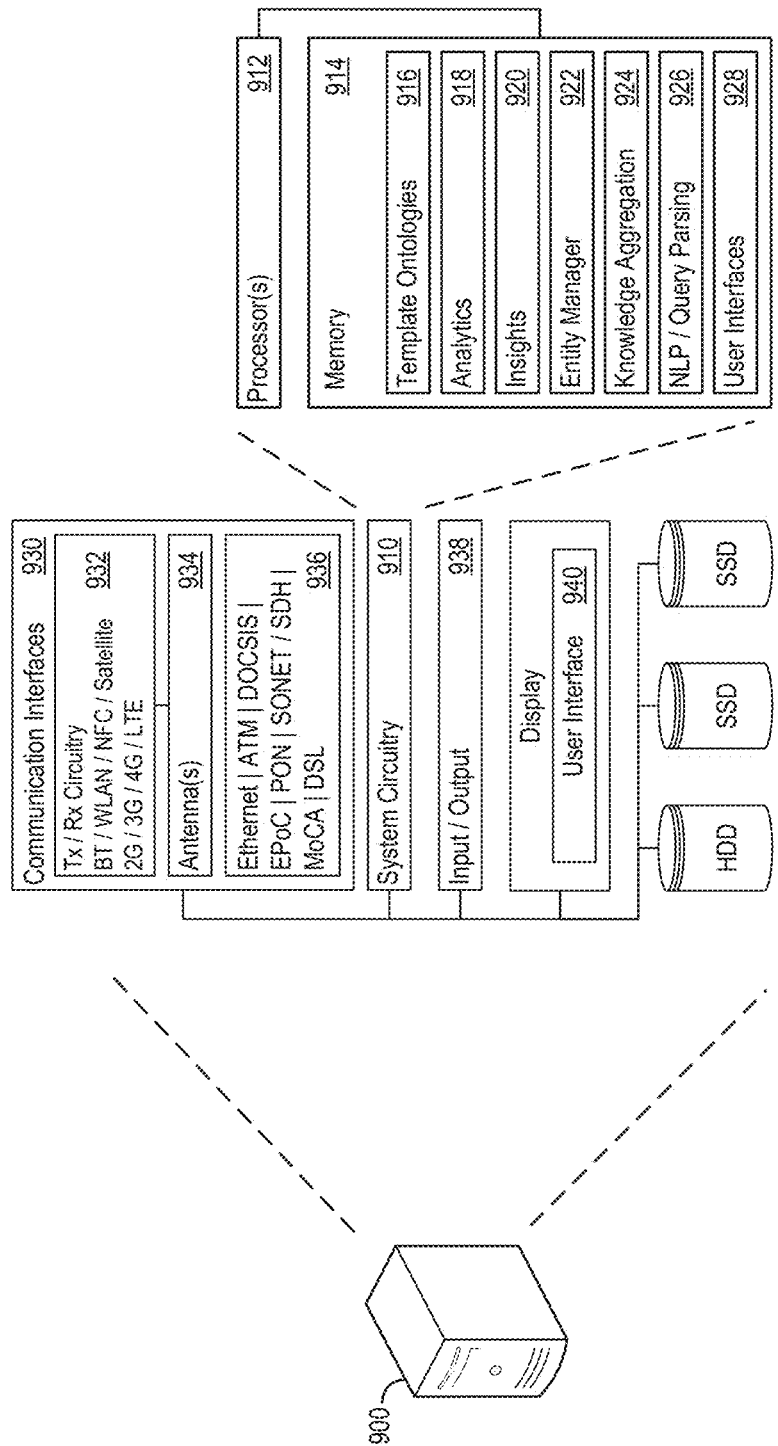
FIG. 9 illustrates an exemplary computer system that may form part of or implement the systems described in the figures or in the following paragraphs.

FIG. 9 shows an example specific system implementation 900 for the knowledge enabled data management system 100 described above. The system implementation 900 may include system circuitry 910 to support implementation of the knowledge enabled data management techniques, including data onboarding, data extraction insight extraction, reconciliation, analytics, relationship extraction, knowledge extraction, knowledge aggregation, and query processing and interfacing. The system circuitry 910 may include processors 912, memory 914, and/or other circuitry. Further, in some embodiments, various circuitry elements may be implemented by the system circuitry 910. For example, the data onboarding circuitry 108, the data extraction circuitry 110, the insight extraction circuitry 134, the reconciliation circuitry 120, the analytics circuitry 124, the relationship and knowledge extraction and indexing circuitry 138, the knowledge aggregator circuitry 128, and/or the query interface circuitry 154 may be implemented by one or more instances of the system circuitry 910. The memory 914 may store the data and/or instructions for template ontologies 916, analytics 918, insights 920, entity management 922, knowledge aggregation 924, natural language processing and query parsing 926, and user interfaces 928, amongst other stored data and instructions.

The system implementation 900 may also include commutation interfaces 930, which may support wireless, e.g., Bluetooth, Wi-Fi, WLAN, cellular (4G, LTE/A), and/or wired, Ethernet, Gigabit Ethernet, optical networking protocols, and/or other networks and network protocols 932 using wired or wireless communications and antennas 934. The communication interface 930 may be connected or configured to connect to one or more networks, including the Internet or an intranet 936. The communication interface may support communication with external or third-party servers or databases and/or data sources (e.g., in a networked or IoT implementation). The system implementation 900 may include various I/O interfaces 938. The system implementation 900 may also include a display and user interface 940 that may include human interface devices and/or graphical user interfaces (GUI). The GUI may be used to present a control dashboard, actionable insights and/or other information to a user. In various implementations, the GUI may support portable access, such as, via a web-based GUI.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system comprising:
   knowledge extraction circuitry configured to:
      receive first data;
      store a first data instance representative of the first data in a knowledge graph stored within a database according to a first ontology corresponding to the first data, the first data instance comprising a first graph entity, a second graph entity and a third graph entity;
   enterprise analytics circuitry configured to:
      determine the third graph entity of the first data instance is not completed with information from the first data;
      review the knowledge graph to determine inferred information to complete the third graph entity of the first data instance, the determination of the inferred information comprising at least one of a deduction, an induction, or an abduction; and
      complete the third graph entity of the first data instance with the inferred information;
   query interface circuitry configured to:
      receive a query regarding the first data; and
      parse the first query to derive a first query entity;
   knowledge aggregator circuitry configured to:
      search the knowledge graph stored within the database for a first graph entity corresponding to the first query entity, the first graph entity comprising a portion of the first data instance;
      return to the query interface a first identification of the first graph entity; and
      return to the query interface a second identification of at least a second graph entity related to the first graph entity via the first data instance and stored within the knowledge graph;
   wherein the query interface circuitry is further configured to:
      provide, responsive to the query, second data corresponding to the first graph entity and third data corresponding to the second graph entity.

2. The system of claim 1, wherein the knowledge aggregator circuitry is further configured to:
   determine at least one of the second data corresponding to the first graph entity and the third data corresponding to the second graph entity comprises a probabilistic measure of the relationship of the first graph entity to the second graph entity.

3. The system of claim 1, further comprising:
   data extraction circuitry configured to:
      determine whether the first data received from a first data source requires a manual onboarding process or an automated extraction process;
      route the first data to a manual onboarding process when a data type associated with the first data has not yet been onboarded; and
      route the first data to an automated extraction process when the data type associated with the first data has already been onboarded.

4. The system of claim 3 further comprising:
   insight extraction circuitry configured to:
      receive the first data from the data extraction circuitry;
      detect one or more perceived relationships within the first data according to the first ontology; and
      store the one or more perceived relationships within an insight database as associated with the first data.

5. The system of claim 4 further comprising:
   reconciliation circuitry configured to:
      receive the first data from the data extraction circuitry;
      receive the one or more perceived relationships within the first data from the insight database;
      receive an input validating that the one or more perceived relationships are correct; and
      validate the first ontology as associated with the first data.

6. The system of claim 1 further comprising:
   relationship extraction circuitry configured to:
      determine a set of relationships corresponding to the first data stored within a second database; and
      store the set of relationships within an insight database as associated with the first data.

7. A method comprising:
   receiving first data via knowledge extraction circuitry;
   storing a first data instance representative of the first data in a knowledge graph stored within a database according to a first ontology corresponding to the first data, the first data instance comprising a first graph entity, a second graph entity and a third graph entity;
   determining the third graph entity of the first data instance is not completed with information from the first data;
   reviewing the knowledge graph to determine inferred information to complete the third graph entity of the first data instance, the determination of the inferred information comprising at least one of a deduction, an induction, or an abduction; and
   completing the third graph entity of the first data instance with the inferred information;
   receiving a query regarding the first data; and
   parsing the first query to derive a first query entity;
   searching the knowledge graph stored within the database for the first graph entity corresponding to the first query entity, the first graph entity comprising a portion of the first data instance;
   returning to the query interface a first identification of the first graph entity;
   returning to the query interface a second identification of at least the second graph entity related to the first graph entity via the first data instance and stored within the knowledge graph; and
   providing, responsive to the query, second data corresponding to the first graph entity and third data corresponding to the second graph entity.

8. The method of claim 7, further comprising:
   determining at least one of the second data corresponding to the first graph entity and the third data corresponding to the second graph entity comprises a probabilistic measure of the relationship of the first graph entity to the second graph entity.

9. The method of claim 7, further comprising:
determining whether the first data received from a first data source requires a manual onboarding process or an automated extraction process;
routing the first data to a manual onboarding process when a data type associated with the first data has not yet been onboarded; and
routing the first data to an automated extraction process when the data type associated with the first data has already been onboarded.

10. The method of claim 7 further comprising:
receiving the first data;
detecting one or more perceived relationships within the first data according to the first ontology; and
storing the one or more perceived relationships within an insight database as associated with the first data.

11. The method of claim 10 further comprising:
receiving the one or more perceived relationships within the first data from the insight database;
receiving an input validating that the one or more perceived relationships are correct; and
validating the first ontology as associated with the first data.

12. The method of claim 7 further comprising:
determining a set of relationships corresponding to the first data stored within a second database; and
storing the set of relationships within an insight database as associated with the first data.

13. A product comprising a non-transitory computer readable medium having stored thereon computer executable instructions that when executed cause the computer to:
receive first data via knowledge extraction circuitry;
store a first data instance representative of the first data in a knowledge graph stored within a database according to a first ontology corresponding to the first data, the first data instance comprising a first graph entity, a second graph entity and a third graph entity;
determine the third graph entity of the first data instance is not completed with information from the first data;
review the knowledge graph to determine inferred information to complete the third graph entity of the first data instance, the determination of the inferred information comprising at least one of a deduction, an induction, or an abduction; and
complete the third graph entity of the first data instance with the inferred information;
receive a query regarding the first data;
parse the first query to derive a first query entity;
search the knowledge graph stored within the database for a first graph entity corresponding to the first query entity, the first graph entity comprising a portion of the first data instance;
return to the query interface a first identification of the first graph entity;
return to the query interface a second identification of at least a second graph entity related to the first graph entity via the first data instance and stored within the knowledge graph; and
provide, responsive to the query, second data corresponding to the first graph entity and third data corresponding to the second graph entity.

14. The product of claim 13, wherein the computer executable instructions that when executed cause the computer further to:
determine at least one of the second data corresponding to the first graph entity and the third data corresponding to the second graph entity comprises a probabilistic measure of the relationship of the first graph entity to the second graph entity.

* * * * *